United States Patent
Tate, Jr. et al.

(10) Patent No.: US 9,008,955 B2
(45) Date of Patent: Apr. 14, 2015

(54) ROUTE PLANNING SYSTEM FOR VEHICLES

(75) Inventors: Edward D. Tate, Jr., Grand Blanc, MI (US); Charles A. Massoll, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1114 days.

(21) Appl. No.: 12/435,691

(22) Filed: May 5, 2009

(65) Prior Publication Data
US 2010/0286908 A1 Nov. 11, 2010

(51) Int. Cl.
*G06F 19/00* (2011.01)
*G01C 21/34* (2006.01)

(52) U.S. Cl.
CPC .................. *G01C 21/3469* (2013.01)

(58) Field of Classification Search
CPC ............... G01C 21/3469; G01C 21/00; G01C 21/3446; G06Q 30/0283; G06Q 30/0284; G06F 17/30241; G08G 1/096822; G08G 1/096827; G08G 1/096838; G08G 1/096844; G08G 1/096861; G08G 1/096866; G08G 1/096883
See application file for complete search history.

(56) References Cited

U.S. PATENT DOCUMENTS

| | | | | |
|---|---|---|---|---|
| 2007/0005237 A1* | 1/2007 | Needham et al. | | 701/202 |
| 2007/0106465 A1* | 5/2007 | Adam et al. | | 701/209 |
| 2008/0125958 A1* | 5/2008 | Boss et al. | | 701/123 |
| 2008/0189033 A1* | 8/2008 | Geelen et al. | | 701/209 |
| 2008/0221787 A1* | 9/2008 | Vavrus | | 701/201 |
| 2009/0088962 A1* | 4/2009 | Jones | | 701/200 |
| 2009/0157289 A1* | 6/2009 | Graessley | | 701/123 |
| 2010/0198508 A1* | 8/2010 | Tang | | 701/210 |

FOREIGN PATENT DOCUMENTS

| | | |
|---|---|---|
| CN | 101253388 A | 8/2008 |
| DE | 19605458 C1 | 9/1997 |
| DE | 10335927 A1 | 3/2005 |
| DE | 102004022265 A1 | 12/2005 |
| DE | 102005003081 A1 | 8/2006 |
| DE | 102005055243 A1 | 5/2007 |
| DE | 102007037329 A1 | 2/2008 |

* cited by examiner

*Primary Examiner* — Ryan Zeender
*Assistant Examiner* — Dana Amsdell
(74) *Attorney, Agent, or Firm* — Quinn Law Group, PLLC

(57) ABSTRACT

A navigation system includes a user-operable input device configured to receive a desired destination. A storage medium stores a map database that describes a road network comprising route segments. The map database includes, for each of the route segments, a respective attribute value and a respective energy cost. A processor is configured to analyze the route segments in the database in accordance with a predetermined optimization algorithm that considers both the attribute values and the energy costs of the route segments in order to select a combination of route segments from the database that interconnects a starting location and the destination.

5 Claims, 4 Drawing Sheets

| ROAD SEGMENT | DISTANCE (MILES) | TIME (SECONDS) |
|---|---|---|
| 66A | 10 | 655 |
| 66B | 10 | 655 |
| 66C | 10 | 1028 |
| 66D | 10 | 800 |
| 66E | 10 | 655 |
| 66F | 10 | 800 |
| 66G | 10 | 800 |
| 66H | 10 | 1028 |
| 66I | 10 | 800 |
| 66J | 10 | 655 |
| 66K | 10 | 1028 |
| 66L | 10 | 1028 |
| 66M | 25 | 1285 |
| 66N | 5 | 360 |
| 66P | 11 | 565 |
| 66Q | 25 | 1285 |

|     | N1  | N2  | N3  | N4  | N5  | N6  | N7  | N8  | N9  | N10 |
|-----|-----|-----|-----|-----|-----|-----|-----|-----|-----|-----|
| N1  | -   | 66A | -   | 66M | 66C | -   | -   | -   | -   | -   |
| N2  | 66A | -   | 66B | -   | -   | 66D | -   | -   | -   | -   |
| N3  | -   | 66B | -   | 66N | -   | -   | 66E | -   | -   | -   |
| N4  | 66M | -   | 66N | -   | -   | -   | 66P | -   | -   | 66Q |
| N5  | 66C | -   | -   | -   | -   | 66F | -   | 66I | -   | -   |
| N6  | -   | 66D | -   | -   | 66F | -   | 66G | -   | 66I | -   |
| N7  | -   | -   | 66E | 66P | -   | 66G | -   | -   | -   | 66J |
| N8  | -   | -   | -   | -   | 66H | -   | -   | -   | 66K | -   |
| N9  | -   | -   | -   | -   | -   | 66I | -   | 66  | -   | 66L |
| N10 | -   | -   | -   | 66Q | -   | -   | 66J | -   | 66L | -   |

FIG. 5

| ROAD SEGMENT | ENERGY (KILOWATT-HOURS) |
|---|---|
| 66A | 2.6 |
| 66B | 2.6 |
| 66C | 2.1 |
| 66D | 2 |
| 66E | 2.6 |
| 66F | 2 |
| 66G | 2 |
| 66H | 2.1 |
| 66I | 2 |
| 66J | 2.6 |
| 66K | 2.4 |
| 66L | 2.4 |
| 66M | 7.5 |
| 66N | 1 |
| 66P | 3.5 |
| 66Q | 7.5 |

FIG. 6

ROUTE PLANNING SYSTEM FOR VEHICLES

TECHNICAL FIELD

This invention relates to vehicle navigation systems.

BACKGROUND OF THE INVENTION

Navigation systems are configured to select a route from a starting location to a desired destination. Navigation systems typically select a route that is optimized for travel time, travel distance, or route complexity.

SUMMARY OF THE INVENTION

A navigation system includes a location detection device configured to determine a starting location and a user-operable input device configured to receive a desired destination. A storage medium stores a map database that describes a road network comprising route segments. Each of the route segments is characterized by a respective attribute value and a respective energy cost.

A processor is operatively connected to the location detection device to receive the starting location, operatively connected to the input device to receive the desired destination, and operatively connected to the storage medium and configured to selectively access the map database. The processor is configured to analyze the route segments in the database in accordance with a predetermined optimization algorithm that considers both the attribute values and the energy costs of the route segments to select a combination of route segments from the database that interconnects the starting location and the destination.

Accordingly, the navigation system selects a route that is a balance between the competing objectives of travel time and fuel costs. A corresponding method is also provided. The method includes receiving a starting location, receiving a predetermined destination, and accessing a map database. The map database describes a road network comprising route segments. Each of the route segments is characterized by a respective attribute value and a respective energy cost.

The method further includes analyzing the route segments in the database in accordance with a predetermined optimization algorithm that considers both the attribute values and the energy costs of the route segments to select a combination of route segments from the database that interconnects the starting location and the destination.

According to another aspect of the invention, a method of modifying a navigation system includes providing a pre-existing navigation system with a database and a processor. The database describes a road network having route segments. The route segments have respective attribute values and respective energy costs. The processor is configured to perform an optimization analysis of the attribute values to select a route. The method further comprises modifying the processor such that the optimization analysis includes the attribute values and the energy costs.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a table depicting the interconnections in the road network of FIG. 4;

FIG. 6 is a table displaying data describing the road network of FIG. 3;

DESCRIPTION OF THE PREFERRED EMBODIMENTS

Figure 1:
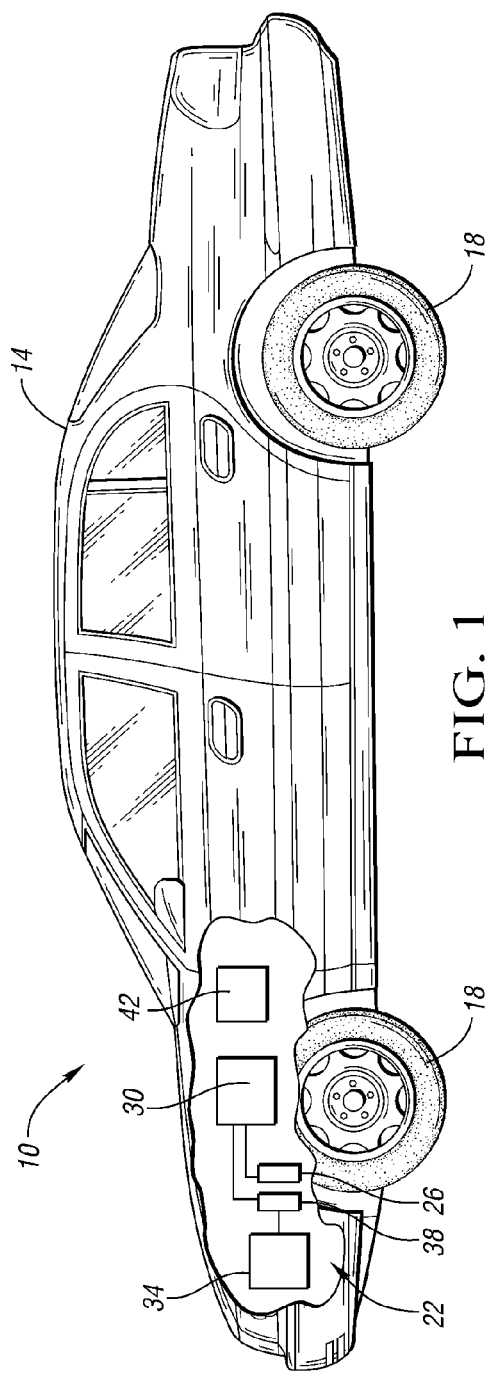
FIG. 1 is a schematic, elevational, partial cutaway view of a vehicle having a hybrid-electric powertrain and a navigation system.

Referring to FIG. 1, an automotive vehicle 10 includes a vehicle body 14. A plurality of wheels 18 are rotatably mounted with respect to the body 14 and support the body 14 on the ground, as understood by those skilled in the art. The vehicle 10 also includes a powertrain 22. In the embodiment depicted, the powertrain 22 includes an electric motor 26 having a rotor (not shown) operatively connected to at least one of the wheels 18 to transfer torque thereto for propelling the vehicle 10. The powertrain 22 also includes a battery 30 operatively connected to the motor 26 and configured to selectively supply electrical energy to the motor 26.

The powertrain 22 in the embodiment depicted further includes an engine 34 and a generator 38. The engine 34 is operatively connected to the generator 38 to drive the generator 38, which causes the generator 38 to generate electrical energy, as understood by those skilled in the art. The generator 38 is operatively connected to the battery 30 to supply electrical energy thereto for recharging the battery 30. The generator 38 is also operatively connected to the motor 26 to selectively supply electrical energy thereto. A powertrain control module (not shown) controls the flow of electrical energy between the generator 38, the motor 26, and the battery 30, depending on the driver power command, the state of charge of the battery 30, etc.

The powertrain 22 in the embodiment depicted is a series hybrid-electric powertrain. In an exemplary embodiment, the powertrain 22 is a plug-in hybrid-electric powertrain, in which the battery 30 is rechargeable by an offboard electrical source (such as the electric grid). Other powertrain configurations may be employed within the scope of the claimed invention. For example, and within the scope of the claimed invention, the powertrain 22 may have a parallel hybrid configuration, the powertrain 22 may have a battery-electric configuration, the powertrain 22 may not include any electric motors and have the engine 34 connected to the wheels 18 via a multi-speed transmission, etc.

Figure 2:
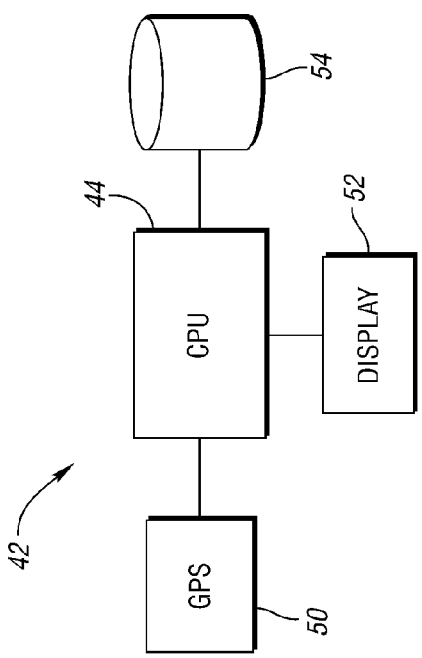
FIG. 2 is a schematic view of the navigation system of FIG. 1.

The vehicle 10 also includes a navigation system 42 mounted with respect to the vehicle body 14. Referring to FIG. 2, wherein like reference numbers refer to like components from FIG. 1, the navigation system 42 includes a processor 44, a location detection device which, in the embodiment depicted, is a global positioning system (GPS) receiver 50, a data input/output device 52 such as a touch-screen display, and a data storage medium 54.

Figures 3, 4:
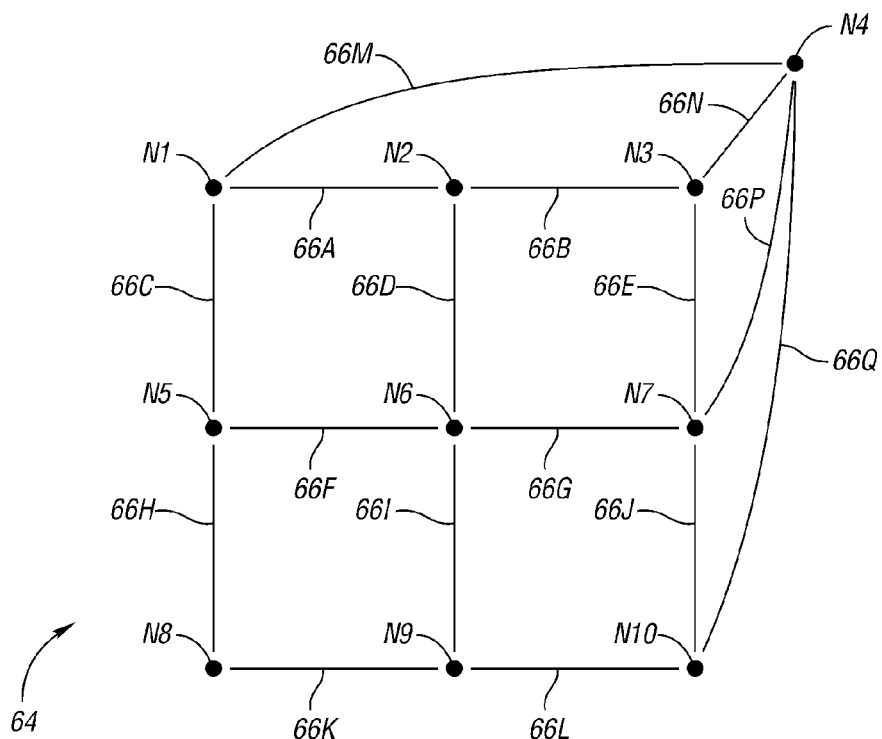
FIG. 3 is a schematic depiction of a road network.
FIG. 4 is a table displaying data describing the road network of FIG. 3.

The data storage medium 54 stores a map database describing a road network. An exemplary portion of a road network is shown at 64 in FIG. 3. Referring to FIG. 3, the road network 64 includes a plurality of roads 66A-Q, each of which extends between two nodes N1-N10. Each node N1-N1 interconnects at least three of the roads 66A-Q, and thus represents a point at which a route can change. For example, a vehicle 10 travelling on road 66M is committed to continuing on road 66M until the vehicle reaches either node N1 or N4. At node N1, the vehicle 10 on road 66M may take either road 66C or road 66A. Exemplary nodes include intersections, junctions, etc.

The map database includes data describing the road network 64 and its attributes, including geographic attributes such as the locations of the roads 66A-Q and nodes N1-N10. Road names and street addresses, as well as latitude and longitude, are also encoded as part of the map database. Attributes for each of the roads 66A-Q include costs the vehicle 10 or driver of the vehicle 10 incurs to travel thereon. Costs for each road include time (i.e., the amount of time it takes for the vehicle 10 to travel the length of the road between nodes) and distance (i.e., the distance the vehicle travels from one end of the road to the other between nodes). Referring to FIG. 4, the map database also includes, for each of the roads 66A-Q, a distance cost value and a time cost (also referred to herein as "estimated travel time"). The estimated travel time of each road is an estimate of the amount of time a vehicle will take to travel the length of the road, and may be based on a variety of factors, such as the legal speed limit of the road, the average traffic congestion of the road, etc.

The map database also includes the information shown in the matrix of FIG. 5. Referring to FIG. 5, the matrix depicts whether two nodes are directly connected by a road, and, if so, by which road. Thus, for example, node N4 and node N10 are connected by road 66Q.

Referring to FIG. 6, the map database also includes, for each of the roads 66A-Q, a respective energy cost. The energy cost of each road is an estimate of the amount of energy that must be expended to propel the vehicle 10 along the length of the road, and may be based on a variety of factors, such as the legal speed limit of the road, the average traffic congestion of the road (e.g., the amount of start and stop operation), the condition of the road (e.g., paved or unpaved), the topography of the road (uphill, downhill, etc). It should be noted that the estimated travel time of a road and the estimated energy cost of a road may vary with the direction of travel on the road. Accordingly, and within the scope of the claimed invention, the map database may include for each road two estimated travel times and two estimated energy costs, with one of the estimated travel times and one of the estimated energy costs being for travel in one direction and the other of the estimated travel times and estimated energy costs being for travel in the other direction. Other variations of road attribute data may be employed within the scope of the claimed invention.

Figure 7:
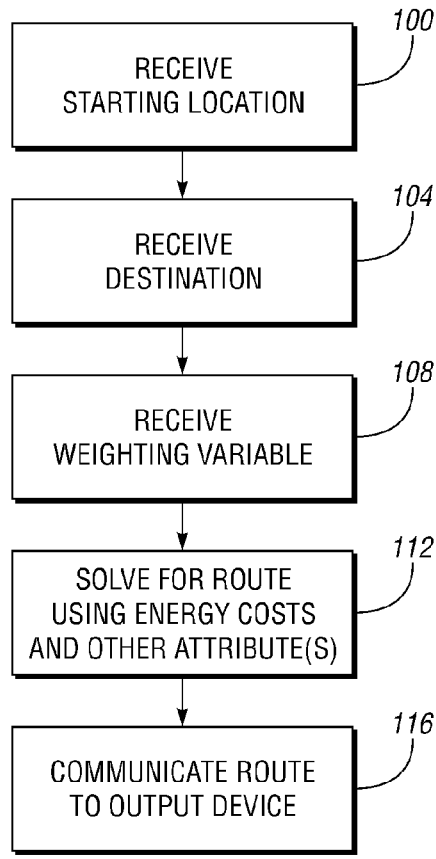
FIG. 7 is a flow chart depiction of a method and exemplary control logic for the navigation system of FIGS. 1 and 2.

FIG. 7 schematically depicts a method of determining a route, and represents an exemplary control logic for the processor 44 of the navigation system. Referring to FIGS. 2 and 7, the processor 44 receives a starting location at step 100. As understood by those skilled in the art, the GPS receiver 50 is configured to determine the geographic location of the vehicle 10 based on satellite signals. The GPS receiver 50 is operatively connected to the processor 44 and is configured to communicate the location of the vehicle 10 to the processor 44. The location of the vehicle 10, as transmitted by the GPS receiver 50 to the processor 44, is typically the starting location received at step 100. Alternatively, and within the scope of the claimed invention, the processor 44 may receive the starting location from a vehicle operator via an input device 52 or user interface.

The processor 44 receives a desired destination from the input/output device 52 at step 104. Those skilled in the art will recognize a variety of other input devices that may be employed within the scope of the claimed invention, such as, for example, microphones (with speech recognition hardware and software), keyboards, etc. At step 108, the processor receives a weighting variable value from the vehicle user via the input/output device 52.

The road network 64 defines a plurality of possible routes that the vehicle 10 may travel from the starting location to the destination. For example, if the vehicle 10 is at node N1 (i.e., if the starting location received at step 100 is node N1), and the driver of the vehicle 10 desires to travel to node N10 (i.e., the destination received at step 104 is node N10), one possible route comprises road 66C, node N5, road 66H, node N8, road 66K, node N9, and road 66L. Another possible route comprises road 66M, node N4, road 66P, node N7, and road 66J.

The possible routes are combinations of the roads and/or portions thereof that interconnect the starting location and the destination, and thus roads 66A-Q are route segments. A route's time cost is therefore the sum of the time costs of the route segments that comprise the route. For example, the estimated travel time of the route comprised of roads 66C, 66H, 66K, and 66L is the sum of the estimated travel times of roads 66C, 66H, 66K, and 66L, i.e., 4.112 seconds. Similarly, a route's energy cost is the sum of the energy costs of the route segments that comprise the route.

At step 112, the processor 44 accesses the map database stored by medium 54 and analyzes the route segments 66A-Q in accordance with a predetermined optimization algorithm to select a combination of route segments that interconnects the starting location received at step 100 and the destination received at step 104. The optimization algorithm considers both the time costs and the energy costs of the route segments 66A-Q so that the resultant combination of route segments, or route, has desirably low total travel cost and total energy cost.

The analysis at step 112 may include a parsimony function that eliminates nodes that are unlikely to be touched by any feasible route. An exemplary parsimony function is to estimate the diameter of a circle enclosing a convex hull about the starting location, destination, and way points for the trip. Any node in the directed graph that is outside this circle and more than a radius away from any point selected for the trip is removed. Thus, for example, the road network 64 may comprise all the public roads in a large geographic region, and the parsimony function may reduce the relevant roads and nodes to those shown in FIG. 3.

In the embodiment depicted, the optimization algorithm solves for, of the possible combinations of route segments interconnecting the starting location and the destination, that combination of route segments having the lowest summation of a mathematical expression that includes time cost and energy cost. The problem is expressed as $$u^* \in \begin{cases} \operatorname{argmin}_{u_1, u_2 \ldots}, \sum_{k=1}^{\infty} c(x_k, u_k) + \lambda \cdot E(x_k, u_k) \\ \text{subject to} \\ u_k \in U(x_k) \end{cases} \quad (\text{eq. 1})$$

where where c(x, u) is the estimated time cost to travel from node x to node u, U(x) is a set that contains the feasible next nodes given the current node, E(x, u) is the estimated energy cost to travel from node x to node u, and λ is the weighting variable received at step 108. Thus, c(x, u) is the estimated time cost of the road that extends from node x to node u, and E(x, u) is the estimated energy cost of the road that extends from node x to node u.

When λ is equal to zero, the route having the lowest time cost is produced. When λ is greater than zero, then a route which balances energy usage against time cost will be produced. Accordingly, the vehicle operator determines the importance of energy cost in the selection of a route through the assignment of the weighting variable value at step 108. An alternative is to use a relative weighting between the original costs and the energy costs:

$$u^* \in \left\{ \begin{array}{l} \operatorname{argmin}_{u_1, u_2 \ldots}, \sum_{k=1}^{\infty} \alpha \cdot c(x_k, u_k) + (1-\alpha) \cdot E(x_k, u_k) \\ \text{subject to} \\ u_k \in U(x_k) \end{array} \right. \quad \text{(eq. 2)}$$

where α is the weighting variable received at step 108 and is between zero and one. When α is one, the route having the lowest time cost is produced. When α is zero, the minimum energy route is produced.

At step 116, the processor 44 communicates the route determined at step 112 to the driver of the vehicle 10 via an output device, such as the input/output device 52. Those skilled in the art will recognize a variety of different formats for communicating the route to the driver of the vehicle at step 116, such as a list of driving instructions, a map highlighting the solution, etc. In an exemplary embodiment, the solution is communicated over time, with driving instructions provided on a "turn by turn" basis as the vehicle progresses along the route the comprises the solution. The processor 44 may also determine the total energy cost and the total time cost of the route determined at step 112, and communicate the total time cost and total energy cost to the output device at step 116.

In the embodiment depicted, the input device and the output device of the navigation system 42 are combined in a single device 52, which may, for example, be a touch-screen display through which a user may input information by touching the screen. However, within the scope of the claimed invention, a navigation system may include separate input and output devices. Those skilled in the art will recognize a variety of other input devices that may be employed within the scope of the claimed invention, such as, for example, microphones (with speech recognition hardware and software), keyboards, etc. Those skilled in the art will recognize a variety of other output devices that may be employed within the scope of the claimed invention, such as, for example, a liquid crystal display (LCD) screen without touch-screen functionality, audio speakers, etc. Speakers may be used in conjunction with, or instead of, a visual display.

In the embodiment depicted, the map database stores a single energy cost and a single travel cost for each road; however, and within the scope of the claimed invention, the estimated travel times and the estimated energy costs may be stored in any format within the scope of the claimed invention, such as look-up tables, formulae, etc. For example, and within the scope of the claimed invention, energy costs may be unitless factors that may be applicable to any vehicle. Energy costs may be estimated from other information stored in the database. For example, energy costs may be estimated from speed limits of road segments, classification of road segments (e.g. paved, gravel, etc), etc. It should be noted that, in the context of the claimed invention, a "processor" may include a plurality of processors that cooperate to perform the operations described herein.

Those skilled in the art will recognize a variety of data storage media that may be employed within the scope of the claimed invention. For example, data storage medium 54 may be a hard drive, read-only memory, writable read-only memory, optical media such as a compact disk, etc. It should be noted that, in the context of the claimed invention, a "data storage medium" may include multiple storage media. For example, and within the scope of the claimed invention, the map database may be distributed over two or more data storage media.

Figure 8:
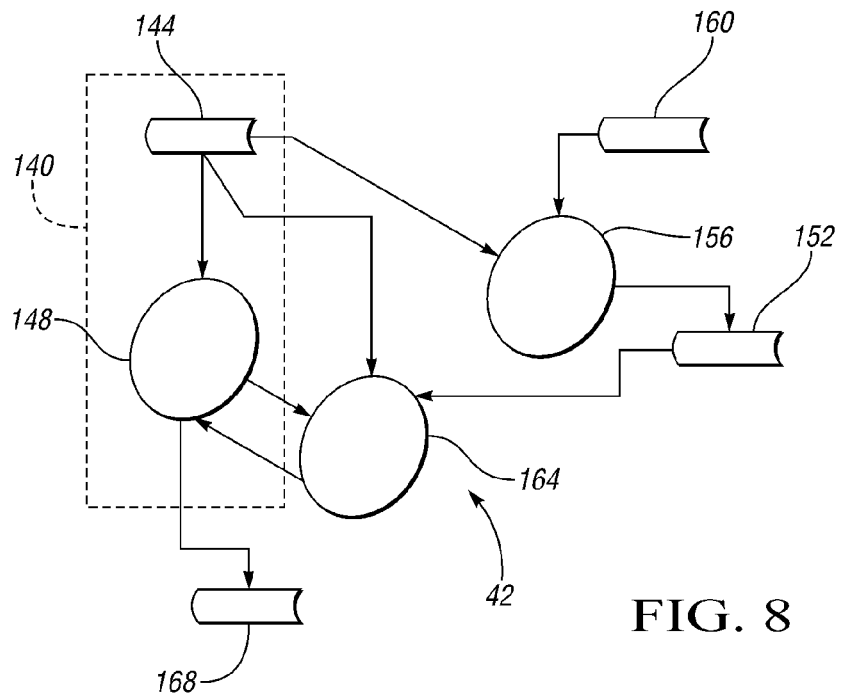
FIG. 8 is a data flow diagram depicting modification of existing software to achieve the functionality of the method of FIG. 7.

Referring to FIG. 8, in an exemplary embodiment, the navigation system 42 is created from a pre-existing navigation system 140 having map database 144 that includes the time costs and distance costs of FIG. 4, but does not include the energy costs of FIG. 6. Furthermore, in the pre-existing navigation system 140, the processor (shown at 44 in FIG. 2) is programmed with software 148 that employs an optimization algorithm that uses the time costs or the distance costs from database 144 according to the following equation:

$$u^* \in \left\{ \begin{array}{l} \operatorname{argmin}_{u_1, u_2 \ldots}, \sum_{k=1}^{\infty} c(x_k, u_k) \\ \text{subject to} \\ u_k \in U(x_k) \end{array} \right. \quad \text{(eq. 3)}$$

Thus, the pre-existing navigation system 140 with the original software 148 generates the route from the starting location to the destination having the lowest time cost or the lowest distance cost, and does not take into account the energy costs associated with the route segments. A method of modifying the pre-existing navigation system 140 includes generating energy cost data 152 for each of the route segments (e.g., the data of FIG. 6). In the embodiment depicted, the energy cost data 152 is generated by an algorithm 156 using road database 144 and data 160 describing characteristics of the vehicle (shown at 10 in FIG. 1).

For example, vehicle characteristics 160 may include the mass of the vehicle 10, the coefficient of drag of the vehicle 10, etc. Data from the road database employed by algorithm 156 to determine energy costs may include, for example, the legal speed limit of the road, the average traffic congestion of the road (e.g., the amount of start and stop operation), the condition of the road (e.g., paved or unpaved), the topography of the road (uphill, downhill, etc). Similarly, and within the scope of the claimed invention, database 144 may include unitless road classifications from which energy costs may be estimated or otherwise determined.

An addition 164 to software 148 provides the road cost function of equations 1 or 2 so that the route 168 generated by the system 42 balances energy cost with another attribute, such as time cost.

Referring again to FIG. 2, it should be noted that, although all of the components of the navigation system 42 are shown onboard vehicle 10, some or all of the components of the navigation system 42 may be offboard the vehicle within the scope of the claimed invention. For example, and within the scope of the claimed invention, the processor 44 and the data storage medium 54 may be offboard the vehicle 10 at a remote location; a wireless communication system, such as a satellite relay system, may operatively connect the processor 44 to the GPS, the touch-screen display, etc.

Although the navigation system 42 is shown and described as being installed in a vehicle 10, it should be noted that, within the scope of the claimed invention, the navigation system may or may not be installed in a vehicle. For example, in one exemplary embodiment, the navigation system 42 is internet-based. More specifically, processor 44 is operatively connected to the input and output devices 52 via the internet. In such an embodiment, the starting location is received from an input device instead of a GPS receiver.

In an internet-based version of the navigation system 42, the data 160 describing characteristics of a vehicle 10 may be entered by a user of the system via an input device, or, alternatively, the storage medium 54 may store the data 160 on behalf of the user. Since an internet-based version of the navigation system 42 will likely have multiple users with different vehicle characteristics, the processor 44 may be programmed to retrieve the vehicle data 160 of a particular user based on a unique identifier such as an e-mail address and password.

While the best modes for carrying out the invention have been described in detail, those familiar with the art to which this invention relates will recognize various alternative designs and embodiments for practicing the invention within the scope of the appended claims.

The invention claimed is:

1. A method of improving the functioning of a navigation system, the navigation system including a user-operable input device, a storage medium, and a processor in electronic communication with the user-operable input device and the storage medium, the method comprising:

receiving a starting location;

receiving a predetermined destination via the user-operable input device;

receiving a weighting variable value from a user via the user-operable input device, wherein the weighting variable value is between zero and one;

accessing a map database stored in the storage medium, the map database describing a road network comprising route segments, wherein said map database includes a single attribute value for each of the route segments and a single energy cost for each of the route segments;

analyzing, via the processor, the route segments in the map database in accordance with a predetermined optimization algorithm that determines a respective route cost for each route segment by scaling the attribute value and the energy cost and then adding the attribute value and the energy cost, wherein scaling includes:

multiplying the attribute value by the weighting variable value received from the user via the user-operable input device;

subtracting the weighting variable value from one;

multiplying the energy cost by the subtraction of the weighting variable value from one; and determining, via the processor, the combination of route segments from the database that cooperate to form a route that interconnects the starting location and the destination having the lowest total of route costs.

2. The method of claim 1, wherein the attribute values are time costs.

3. The method of claim 1, wherein the optimization algorithm solves for, of the possible combinations of route segments interconnecting the starting location and the destination, that combination of route segments having the lowest summation of a mathematical expression that includes attribute value and energy cost.

4. The method of claim 1, further comprising communicating the combination of route segments to an output device.

5. The method of claim 1, wherein the database stores the attribute values of said route segments; and wherein the method further comprises determining the energy costs of the road segments from the stored attribute values.

* * * * *